(12) United States Patent
Fischer et al.

(10) Patent No.: US 6,475,952 B2
(45) Date of Patent: Nov. 5, 2002

(54) PROCESS FOR PRODUCING A CATALYTICALLY ACTIVE MATERIAL, CATALYTIC CONVERTER HAVING A CATALYTICALLY ACTIVE MATERIAL PRODUCED IN THIS MANNER, AND USE OF THE CATALYTIC CONVERTER TO BREAK DOWN DIOXINS AND/OR FURANS

(75) Inventors: Stefan Fischer, Nufringen; Günther Pajonk, Zapfendorf, both of (DE); Frank Witzel, Bloomfield Hills, MI (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/014,248

(22) Filed: Nov. 7, 2001

(65) Prior Publication Data

US 2002/0062577 A1 May 30, 2002

Related U.S. Application Data

(63) Continuation of application No. PCT/DE00/01273, filed on Apr. 25, 2000.

(30) Foreign Application Priority Data

May 7, 1999 (DE) .......................................... 199 21 207

(51) Int. Cl.[7] .............................. B01J 21/06; B01J 23/16
(52) U.S. Cl. ...................................... 502/353; 502/309
(58) Field of Search ................................ 502/305, 308, 502/309, 349, 350, 353

(56) References Cited

U.S. PATENT DOCUMENTS

| | | | | |
|---|---|---|---|---|
| 4,833,113 A | * | 5/1989 | Imanari et al. | 423/239.1 |
| 4,916,107 A | * | 4/1990 | Brand et al. | 423/239.1 |
| 4,977,127 A | * | 12/1990 | Rikimaru et al. | 423/239.1 |
| 5,087,600 A | * | 2/1992 | Kato et al. | 502/309 |
| 5,869,419 A | | 2/1999 | Obayashi et al. | |
| 6,120,747 A | * | 9/2000 | Sugishima et al. | 423/240 S |

FOREIGN PATENT DOCUMENTS

| | | | |
|---|---|---|---|
| DE | 24 58 888 | 6/1975 | |
| DE | 37 36 478 A1 | 5/1989 | |
| DE | 197 45 043 A1 | 4/1999 | |
| EP | 0 252 521 A1 | 1/1988 | |
| EP | 0 313 755 A2 | 5/1989 | |
| EP | 0 471 033 B1 | 2/1992 | |
| EP | 0 472 014 A1 | 2/1992 | |
| EP | 0 514 682 A1 | 11/1992 | |
| EP | 0 815 924 A1 | 1/1998 | |
| JP | 63-147548 | 6/1988 | |
| JP | 63-88047 A | * 4/1998 | ............ B01J/27/53 |
| WO | WO 91/04780 | 4/1991 | |

OTHER PUBLICATIONS

International Search Report for PCT/DE00/01273, issued by the European Patent Office on Aug. 30, 2000.

* cited by examiner

*Primary Examiner*—Stanley S. Silverman
*Assistant Examiner*—Eileen E. Nave
(74) *Attorney, Agent, or Firm*—Laurence A. Greenberg; Werner H. Stemer; Ralph E. Locher

(57) ABSTRACT

To produce a catalytically active material, titanium dioxide, together with an oxide or with a dissolved compound of tungsten and/or vanadium, is processed into a shapeable material. the shapeable material is dried to form a shaped body, and the shaped body is calcined. After the calcining, the shaped body is additionally impregnated with a dissolved compound of titanium and vanadium and is dried again. A catalytically active material of this type has a high catalytic activity with regard to breaking down dioxins and/or furans even in a temperature range of below 250° C. The catalytically active material is particularly suitable for producing dioxin and/or furan catalytic converters.

12 Claims, 2 Drawing Sheets

Fig. 2

| Temperature | Inventive catalytic converter | Comparative catalytic converter |
|---|---|---|
| 130°C | 1 | 0.3 |
| 150°C | 1 | 0.25 |
| 170°C | 1 | 0.2 |
| 200°C | 1 | 0.16 |
| 250°C | 1 | 0.2 |

PROCESS FOR PRODUCING A CATALYTICALLY ACTIVE MATERIAL, CATALYTIC CONVERTER HAVING A CATALYTICALLY ACTIVE MATERIAL PRODUCED IN THIS MANNER, AND USE OF THE CATALYTIC CONVERTER TO BREAK DOWN DIOXINS AND/OR FURANS

CROSS-REFERENCE TO RELATED APPLICATION

This application is a continuation of copending International Application No. PCT/DE00/01273, filed Apr. 25, 2000, which designated the United States.

BACKGROUND OF THE INVENTION

FIELD OF THE INVENTION

The invention relates to a process for producing a catalytically active material, in which titanium dioxide together with an oxide or a dissolved compound of tungsten and/or vanadium is processed to form a shapeable material. The shapeable material is dried to form a shaped body and the shaped body is calcined. The invention also relates to a catalytic converter having a catalytically active material produced in this manner and to using the catalytic converter for breaking down dioxins and/or furans.

A process of this type for the production of a catalytically active material, and a catalytic converter of this type are known, for example, from Published German application DE 24 58 888 A1. Using titanium dioxide-containing catalytic converters to break down dioxins and/or furans is also known from European Patent EP 0 471 033 B1, European Patent EP 0 252 521 A1 or International Publication WO 91/04780.

As has been extensively outlined in the prior art mentioned above, to produce the catalytically active material, the titanium dioxide is initially processed, with the addition of a solvent containing tungsten oxide and/or vanadium oxide, to form a shapeable material. Alternatively, the shapeable material can be produced by adding titanium dioxide to a dissolved compound of tungsten and/or vanadium. By way of example, ammonium paratungstate or vanadyl sulfate are used as dissolved compounds of this type. The shapeability of the material is influenced by the solvent content.

Naturally, additives, such as for example, ceramic fibers, glass fibers and/or film-forming agents, may be admixed with the shapeable material.

Then, the shapeable material is, by way of example, extruded to form a honeycomb body with passages through which a medium can flow. The shapeable material can alternatively be processed further to form pellets, or can be applied as a coating to a supporting body. The coating of the supporting body is effected by rolling the material on or by immersion. The extruded or processed material is then dried and is then referred to as a "shaped body". The shaped body is then calcined to produce the catalytic activity.

Solid bodies consisting of the catalytically active material which has been produced in this manner, or support bodies which have been coated with this material, are in widespread use as catalytic converters for breaking down nitrogen oxides using the SCR (Selective Catalytic Reduction) process or for breaking down dioxins and/or furans. In the SCR process, i.e. the selective catalytic reduction process, nitrogen oxides are reacted in the presence of a reducing agent at the catalytically active material to form harmless nitrogen and water. Dioxins and/or furans are oxidized at the catalytically active material to form harmless compounds.

To break down dioxins and/or furans, which in this context is understood as meaning the polyhalogenated cyclic diethers and ethers, catalytic converters comprising the catalytically active material described above are used at temperatures of between 250 and 350° C. Below 250°, however, the catalytic activity of the active material becomes insufficient to still achieve effective reduction in the level of halogenated hydrocarbons. However, low temperatures of this nature occur, for example, in the off-gas from a garbage incineration plant or a sintering plant. It is also known that at temperatures below 200° C., dioxins and/or furans are formed again during cooling in the off-gas as a result of the DeNOVO synthesis in the presence of organic carbon compounds, alkali metal chlorides or alkaline-earth metal chlorides and metal compounds acting as catalysts. In this case too, it is necessary to treat the off-gas in a temperature range in which the catalytic activity of said catalytic converter is no longer sufficient.

SUMMARY OF THE INVENTION

It is accordingly an object of the invention to provide a process for producing a catalytically active material that has an improved catalytic activity compared to prior art catalytically active materials of this type, and that, in particular, has an improved catalytic activity at temperatures below 250° C. A further object of the invention is to describe a catalytic converter of the type described in the introduction which enables pollutants, and in particular dioxins and/or furans, to be broken down effectively even at low temperatures. A further object of the invention is to describe a use of a catalytic converter of this type.

With the foregoing and other objects in view there is provided, in accordance with the invention, a process for producing a catalytically active material, that includes steps of: processing titanium dioxide together with a component selected from the group consisting of an oxide of tungsten, a dissolved compound of tungsten, an oxide of vanadium, and a dissolved compound of vanadium to form a shapeable material; drying the shapeable material to form a shaped body; calcining the shaped body; impregnating the shaped body with a solution containing titanium and vanadium; and drying the shaped body that has been impregnated.

The object of the invention is achieved by the fact that, in a process of the type described in the introduction, the shaped body is additionally impregnated with a dissolved compound of titanium and vanadium and is dried again.

Extensive tests have demonstrated that a catalytically active material which has undergone further treatment in this manner has an excellent catalytic activity, in particular for the oxidation of dioxins and/or furans, in a temperature range of below 250° C. At temperatures of over 250° C., a catalytically active material which has undergone further treatment of this type also has an improved catalytic activity compared to catalytically active materials which have not undergone further treatment of this type.

It is postulated that the subsequent impregnation with a titanium- and vanadium-containing solution and the subsequent drying leads to the formation of an extremely active, hitherto unrecorded vanadyl-titanyl compound. The shaped body is advantageously impregnated after the calcining. Although in principle the shaped body which has not yet been calcined can also be impregnated with the solution, particular care is required, since the uncalcined shaped body easily breaks up in solution.

In accordance with an added feature of the invention, for catalytic activity, a solution with a molar ratio of titanium to vanadium of between 0.1 and 10 is used for the impregnation operation. The best results with regard to catalytic activity can be produced within this molar ratio.

In accordance with an additional feature of the invention, the shaped body is advantageously impregnated with a solution of vanadyl sulfate and titanyl sulfate. Both vanadyl sulfate and titanyl sulfate have an excellent solubility, in particular in water. Naturally, it is also possible to use a different compound, such as for example ammonium metavanadate, which is soluble in organic solvents instead of vanadyl sulfate. Titanic acids could be used instead of titanyl sulfate.

In accordance with another feature of the invention, tungsten is additionally dissolved in the solution. This can also have a beneficial effect on the catalytic activity of the catalytically active material.

Ammonium paratungstate which, like titanyl sulfate and vanadyl sulfate, is readily soluble in water is recommended as a soluble compound for tungsten. In addition, however, it is also possible to use ammonium heptatungstate, which can likewise be dissolved in hot water or a strong acid.

In accordance with a further feature of the invention, it is advantageous, both with regard to environmental aspects and with regard to cost, if the solution used is an aqueous solution. This makes it possible to dispense with expensive, possibly environmentally hazardous organic solvents and acids altogether during production. With regard to the catalytic activity, it is also advantageous if the further drying which takes place after the impregnation operation takes place at a temperature of between 250 and 400° C. This temperature should in particular be selected in such a way that it is higher than the subsequent temperature at which the catalytically active material is used.

In accordance with a further added feature of the invention, the calcining takes place at a temperature of between 500 and 600° C.

With the foregoing and other objects in view there is also provided, in accordance with the invention, a catalytic converter that includes a catalytically active material which has been produced in accordance with the invention.

With the foregoing and other objects in view there is also provided, in accordance with the invention, a method of using a catalytic converter of this type to break down dioxins and/or furans. In particular, the catalytic converter is recommended for use in the low-temperature range at temperatures of less than 250° C.

Other features which are considered as characteristic for the invention are set forth in the appended claims.

Although the invention is illustrated and described herein as embodied in a process for producing a catalytically active material, catalytic converter having a catalytically active material produced in this manner, and use of the catalytic converter to break down dioxins and/or furans, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a table showing test results.

DESCRIPTION OF THE PREFERRED EMBODIMENTS

Figure 1:
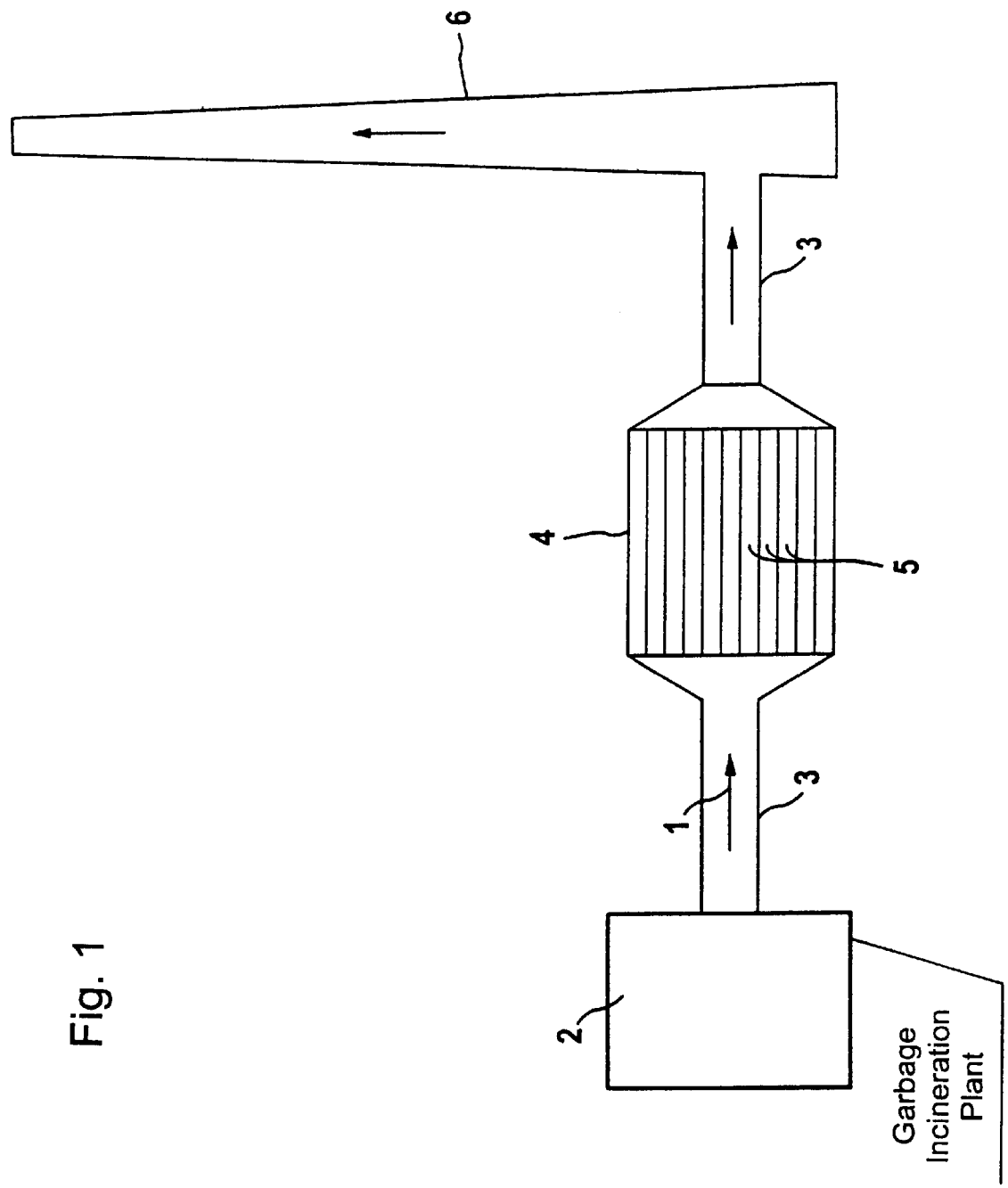
FIG. 1 shows a catalytic-converter body configured in the off-gas duct of a garbage incineration plant.

Referring now to the figures of the drawing in detail and first, particularly, to FIG. 1 thereof, there is shown a garbage incineration plant 2 (not shown in more detail). Off-gas 1 is extracted from the garbage incineration plant 2 into an off-gas duct 3. Domestic garbage with a high plastics content is incinerated in the garbage incineration plant 2, and consequently not insignificant levels of halogenated hydrocarbons, in particular, dioxins and/or furans, are present in the off-gas 1.

To reduce the levels of dioxins and/or furans, a catalytic converter 4 in honeycomb form, through which a medium can flow, is arranged in the off-gas duct 3 of the garbage incineration plant 2. For this purpose, the catalytic converter 4 has a number of parallel passages 5 through which the medium can flow. The catalytic converter 4 is produced as a whole extrudate made from a catalytically active material which contains 80% by weight of titanium dioxide, 8% by weight of tungsten trioxide, 6% by weight of vanadium pentoxide, and the remainder is ceramic auxiliaries and fillers. The catalytically active material was produced by mixing the oxides, then drying the mixture to form a shaped body and finally calcining at 550° C. Then, the shaped body was impregnated with an aqueous solution of vanadyl sulfate, titanyl sulfate and ammonium paratungstate. The molar ratio of titanium to vanadium was 0.4 in the aqueous solution; the molar ratio of titanium to tungsten was 30. The ph of the aqueous impregnation solution was adjusted to between 0 and 2 using sulfuric acid. Other mineral acids cause the catalytic converter to become laden with disruptive chloride or phosphate ions, which is a drawback. After the impregnation of the shaped body, further drying took place at 250° C. for between 1 and 30 minutes.

The off-gas 1 from the garbage incineration plant 2 is at a temperature of approximately 250° C. The dioxins and/or furans contained in the off-gas 1 are converted at the catalytic converter 4 by oxidation. The off-gas 1 from which dioxins and/or furans have been removed after it has flowed through the catalytic converter 4 passes to the environment via a stack 6.

The ability of the catalytic converter described to oxidize dioxins and/or furans is demonstrated by the following example.

EXAMPLE 1

A model off-gas with a space velocity of 5000/h is passed, at various temperatures between 130 and 250° C., over a catalytic converter, which is designed as a whole extrudate in the form of a honeycomb body through which medium can flow. The catalytic converter has a composition of 80% of $TiO_2$, 6% of $V_2O_5$, 8% of $WO_3$, 6% of auxiliaries (data in % by weight), and as described above, was impregnated with an aqueous vanadyl sulfate/titanyl sulfate solution and then was dried at 250° C. The catalytic converter has a square surface area of 150*150 $mm^2$ for the medium to flow onto and 1225 parallel flow passages. The model gas comprises 200 ppm of perchloroethylene in air. Perchloroethylene is used as a model substance for dioxins. The proportion of oxygen in the air is 20%. The concentration of the perchloroethylene in the model gas is measured upstream of the catalytic converter and downstream of the catalytic converter.

For comparison purposes, the same test has been carried out with a catalytic converter which is identical in terms of its composition and geometry, but which has not been impregnated with a vanadyl sulfate/titanyl sulfate solution, but rather only with a vanadyl sulfate solution. In this case too, the concentration of the perchloroethylene in the model gas is measured upstream of the catalytic converter and downstream of the catalytic converter.

The results of the two tests can be seen by referring to the table shown in FIG. 2. The temperature of the model gas is given in the left-hand column of the table. The measured concentrations of perchloroethylene downstream of the catalytic converter are standardized with regard to the catalytic converter that had been impregnated with titanyl sulfate/vanadyl sulfate solution. It is clear that the prior art catalytic converter has a significantly lower catalytic activity in all temperature ranges below 250° C. The catalytic converter that had been impregnated with the titanyl sulfate/vanadyl sulfate solution has a catalytic activity which is approximately 5 times higher.

We claim:

1. A process for producing a catalytically active material, which comprises:

processing titanium dioxide together with a component selected from the group consisting of an oxide of tungsten, a dissolved compound of tungsten, an oxide of vanadium, and a dissolved compound of vanadium to form a shapeable material;

drying the shapeable material to form a shaped body;

calcining the shaped body;

impregnating the shaped body with a solution containing titanium and vanadium; and drying the shaped body that has been impregnated.

2. The process according to claim 1, wherein the impregnating step is performed after the calcining step.

3. The process according to claim 2, which comprises providing the solution with a titanium to vanadium molar ratio of between 0.1 and 10.

4. The process according to claim 1, which comprises providing the solution with a titanium to vanadium molar ratio of between 0.1 and 10.

5. The process according to claim 1, which comprises performing the impregnating step by providing the solution with vanadyl sulfate and titanyl sulfate.

6. The method according to claim 1, which comprises dissolving tungsten in the solution.

7. The process according to claim 6, which comprises dissolving ammonium paratungstate in the solution.

8. The method according to claim 6, which comprises providing the solution with a titanium to tungsten molar ratio of between 10 and 100.

9. The process according to claim 8, which comprises dissolving ammonium paratungstate in the solution.

10. The process according to claim 1, which comprises providing the solution as an aqueous solution.

11. The process according to claim 1, which comprises performing the step of drying the shaped body at a temperature between 250° C. and 400° C.

12. The process according to claim 1, which comprises performing the calcining step at a temperature between 500° C. and 600° C.

* * * * *